(12) United States Patent
Cho et al.

(10) Patent No.: US 10,135,603 B2
(45) Date of Patent: Nov. 20, 2018

(54) CARRIER FREQUENCY OFFSET TRACKING CIRCUIT AND METHOD

(71) Applicant: MStar Semiconductor, Inc., Hsinchu Hsien (TW)

(72) Inventors: Ting-Nan Cho, Hsinchu Hsien (TW); Yi-Ying Liao, Hsinchu Hsien (TW); Ko-Yin Lai, Hsinchu Hsien (TW); Tai-Lai Tung, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/889,547

(22) Filed: Feb. 6, 2018

(65) Prior Publication Data
US 2018/0248678 A1 Aug. 30, 2018

(30) Foreign Application Priority Data
Feb. 24, 2017 (TW) .............................. 106106302 A (51) Int. Cl.
| *H04L 7/00* | (2006.01) |
| *H04L 27/00* | (2006.01) |
| *H04B 1/10* | (2006.01) |
| *H04L 25/02* | (2006.01) |

(52) U.S. Cl.
CPC ......... *H04L 7/0087* (2013.01); *H04B 1/1027* (2013.01); *H04L 25/024* (2013.01); *H04L 27/0014* (2013.01); *H04L 2027/003* (2013.01); *H04L 2027/0069* (2013.01)

(58) Field of Classification Search
CPC ......... H04L 27/2657; H04L 2027/0067; H04L 25/03273; H04L 27/227; H04L 27/2644; H04L 27/2649; H04L 27/266; H04L 27/2665; H04L 27/3818; H04L 2027/0065; H04L 2027/0069; H04L 2027/0073; H04L 27/22; H04L 27/2659; H04L 27/2675; H04L 25/0232; H04L 27/2673; H04L 27/2695; H03J 7/02
See application file for complete search history.

(56) References Cited

U.S. PATENT DOCUMENTS

| 6,219,333 | B1 * | 4/2001 | Ahn | .................... H04L 27/2659 370/203 |
| 8,660,216 | B2 * | 2/2014 | Azenkot | ............... H03L 7/0807 375/340 |
| 9,042,489 | B2 | 5/2015 | Lai | |
| 9,912,503 | B2 * | 3/2018 | Chu | ..................... H04L 27/148 |

(Continued)

FOREIGN PATENT DOCUMENTS

| EP | 1484880 A2 | 12/2004 |
| WO | 2007078101 A1 | 7/2007 |

*Primary Examiner* — Khanh C Tran
(74) *Attorney, Agent, or Firm* — Edell, Shapiro & Finnan, LLC (57) ABSTRACT

A carrier frequency offset (CFO) tracking circuit includes: a CFO estimation circuit, generating an estimated CFO signal; a loop filter, coupled to the CFO estimation circuit, performing a loop filter operation on the estimated CFO signal according to an initial value to generate a loop filtered result; and an averaging circuit, coupled to the CFO estimation circuit and the loop filter, performing an average operation on the estimated CFO signal to generate the initial value as an average of the estimated CFO signal.

10 Claims, 5 Drawing Sheets

(56) References Cited

U.S. PATENT DOCUMENTS

| | | | |
|---|---|---|---|
| 2006/0285478 A1* | 12/2006 | Gaikwad | H04L 27/2657 370/203 |
| 2007/0002981 A1* | 1/2007 | Gaikwad | H04L 27/2657 375/346 |
| 2007/0230591 A1 | 10/2007 | Choi et al. | |
| 2010/0260233 A1* | 10/2010 | Luong | H04L 27/0014 375/136 |
| 2010/0296002 A1 | 11/2010 | Cheng et al. | |
| 2011/0002422 A1 | 1/2011 | Cheng et al. | |
| 2011/0188611 A1 | 8/2011 | Chuang et al. | |
| 2014/0254723 A1* | 9/2014 | Nazarathy | H04L 27/3872 375/326 |
| 2016/0021662 A1* | 1/2016 | Chen | H04L 27/22 370/329 |

\* cited by examiner

CARRIER FREQUENCY OFFSET TRACKING CIRCUIT AND METHOD

This application claims the benefit of Taiwan application Serial No. 106106302, filed Feb. 24, 2017, the subject matter of which is incorporated herein by reference.

BACKGROUND OF THE INVENTION

Field of the Invention

The invention relates in general to a carrier frequency offset (CFO) tracking circuit and method, and more particularly to a CFO tracking circuit and method capable of shortening a tracking time.

Description of the Related Art

In a wireless communication system, a transmitter modulates a signal to be transmitted and up-coverts the modulated signal to a radio-frequency (RF) signal that is then transmitted. Upon receiving the RF signal via an antenna, a receiver down-converts the frequency of the RF signal to a baseband signal that is then demodulated. However, due to a difference between an oscillation frequency that the transmitter uses for the up-conversion and the oscillation frequency that the receiver uses for the down-conversion, an issue of carrier frequency offset (CFO) is incurred in the down-converted signal at the receiver, hence not only complicating the demodulation but also causing an increased error rate of the wireless communication system.

In view of the above, a wireless communication system is usually equipped with a CFO estimation and tracking circuit to solve the issue of CFO. Related background technologies may be referred from "Signal Processing Circuit and Method Thereof" disclosed in the U.S. Patent Publication 2011/0188611 A1, "Circuit for Detecting Digital Data Stream and Associated Method" disclosed in the U.S. Patent Publication 2010/0296002 A1, and "Apparatus for Detecting Digital Video Signal Parameter and Method Thereof" disclosed in the U.S. Patent Publication 2011/0002422 A1 of the Applicant. However, in some communication systems, e.g., a Digital Video Broadcasting-Satellite (DVB-S) communication system, CFO is more significant than other communication systems, and is particularly severe under a low signal-to-noise ratio (SNR). Further, under a low SNR, a CFO estimation and tracking circuit needs an excessively long tracking time in a way that the overall performance is degraded. Therefore, there is a need for a solution for the above issues.

SUMMARY OF THE INVENTION

The invention is directed to a carrier frequency offset (CFO) tracking circuit and method capable of shortening a tracking time to improve issues of the prior art.

The present invention provides a CFO tracking circuit. The CFO tracking circuit includes: a CFO estimation circuit, generating an estimated CFO signal; a loop filter, coupled to the CFO estimation circuit, performing a loop filter operation on the estimated CFO signal according to an initial value to generate a loop filtered result; and an averaging circuit, performing an average operation on the estimated CFO signal to generate the initial value as an average value the estimated CFO signal.

The present invention further discloses a CFO tracking method. The CFO tracking method includes: obtaining an estimated CFO signal; performing an average operation on the estimated CFO signal to generate an initial value as an average value of the estimated CFO signal; and performing a loop filter operation on the estimated CFO signal according to the initial value to generate a loop filtered result.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
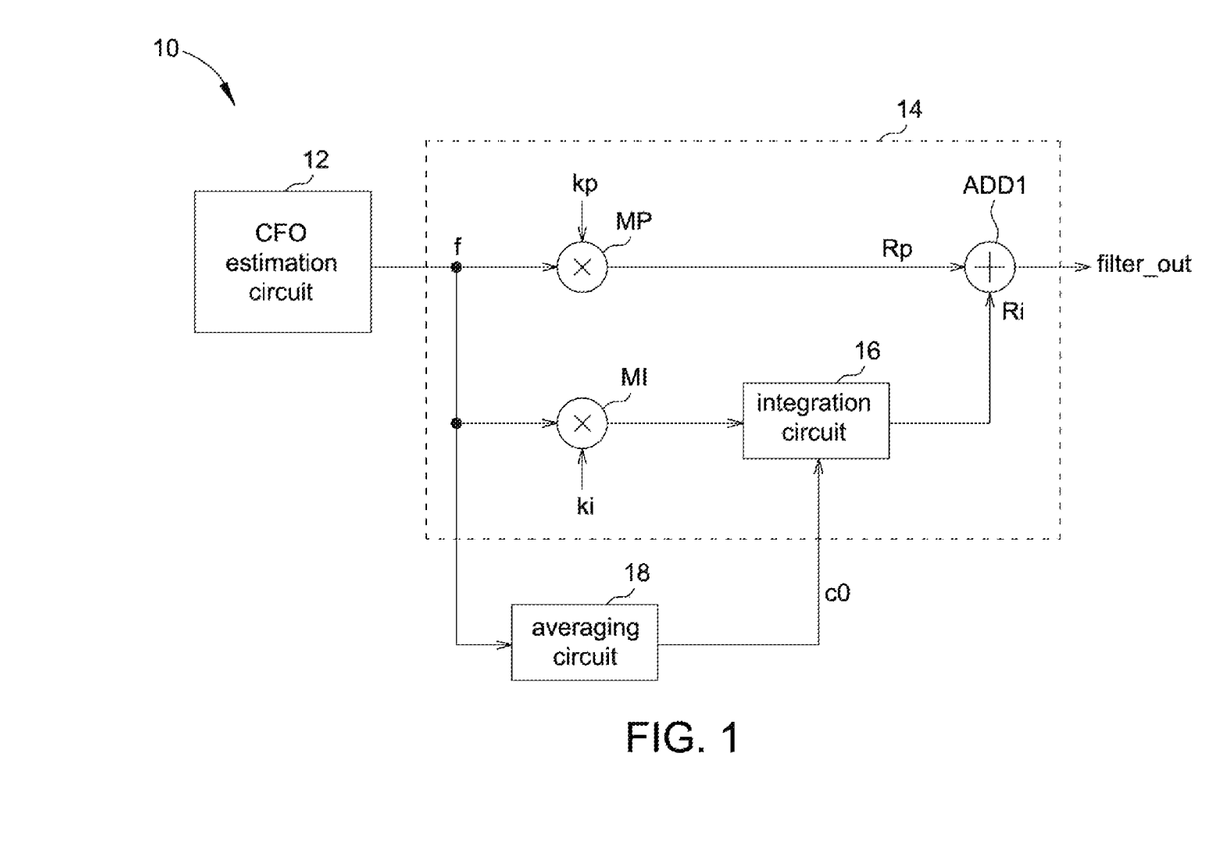
FIG. 1 is a block diagram of a carrier frequency offset (CFO) tracking circuit according to an embodiment of the present invention.

FIG. 1 shows a block diagram of a carrier frequency offset (CFO) tracking circuit 10 according to an embodiment of the present invention. The CFO tracking circuit 10 may be applied to a receiving apparatus (e.g., a demodulator) in a communication system (e.g., a DVB-S system), and includes a CFO estimation circuit 12, a loop filter 14 and an averaging circuit 18. The CFO estimation circuit 12 generates an estimated CFO signal f. The loop filter 14, coupled to the CFO estimation circuit 12 and the averaging circuit 18, performs a loop filter operation on the estimated CFO signal according to an initial value c0 generated by the averaging circuit 18 to generate a loop filtered result filter_out. The averaging circuit 18, coupled to the CFO estimation circuit 12 and the loop filter 14, performs an average operation on the estimated CFO signal f to generate the initial value c0 as an average value outputted to the loop filter 14. That is to say, the initial value c0 may be represented as $c0 = c \cdot ave(f)$, wherein $ave(\cdot)$ represents an operator corresponding to the average operation, and c is a constant that may be modified according to actual conditions.

More specifically, the loop filter 14 includes an integration circuit 16, an adder ADD1 and multipliers MP and MI. The multiplier MP, coupled to the CFO estimation circuit 12, multiplies the estimated CFO signal f by a coefficient kp to generate a proportional result Rp. The multiplier MI, multiplies the estimated CFO signal f by a coefficient ki. The integration circuit 16 performs an integration operation on the estimated CFO signal f having been multiplied by the coefficient ki to generate an integration result Ri. The adder ADD1 adds the proportional result Rp and the integration result Ri to generate the loop filtered result filter_out. The initial value c0 is an initial integration value of the integration operation. Other operation details associated with the CFO tracking circuit 10 may be referred from the U.S. Pat. No. 9,042,489, "Carrier Frequency Offset Compensation Apparatus and Associated Method" of the Applicant, and shall be omitted herein.

Figure 3:
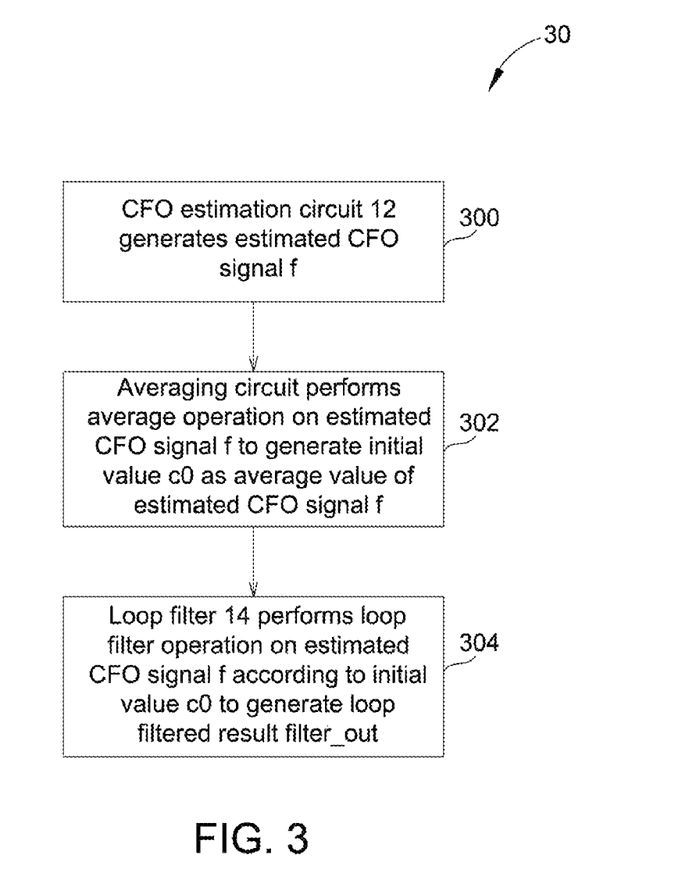
FIG. 3 is a flowchart of a CFO tracking method according to an embodiment of the present invention.

Operations of the CFO tracking circuit 10 may be concluded to a process. FIG. 3 shows a flowchart of a process 30 of a CFO tracking method according to an embodiment of the present invention. The process 30 may be performed by the CFO tracking circuit 10. As shown in FIG. 3, the process 30 includes following steps.

In step 300, the CFO estimation circuit 12 generates the estimated CFO signal f.

In step 302, the averaging circuit 18 performs an average operation on the estimated CFO signal f to generate the initial value c0 as the average value of the estimated CFO signal f.

In step 304, the loop filter 14 performs a loop filter operation on the estimated CFO signal f according to the initial value c0 to generate the loop filtered result filter_out.

Operation details of the process 30 may be referred from the foregoing description, and shall be omitted herein.

It should be noted that, if the integration circuit applied in the CFO tracking circuit does not begin the integration operation with any initial value (i.e., the initial value of the integration circuit is predetermined as 0), the CFO tracking circuit needs a longer tracking time in order to track the correct CFO; i.e., the tracking time of the CFO tracking circuit is too long. In comparison, the integration circuit 16 performs the integration operation on the estimated CFO signal f according to the initial value c0 associated with the estimated CFO signal f (e.g., the initial value c0 may be the first estimated CFO signal calculated by the CFO estimation circuit 12), and the tracking time that the CFO tracking circuit 10 needs is shortened. Further, when the CFO estimation circuit 12 uses a data aided algorithm to calculate an estimated CFO value, the first estimated CFO value that the CFO estimation circuit 12 calculates is usually not accurate enough and hence the effect of shortening the tracking time is limited. In this case, the CFO tracking circuit 10 may use the average value (e.g., c0=ave(f)) of the estimated CFO signal that the averaging circuit 18 calculates as the initial value c0 to further shorten the tracking time that the CFO tracking circuit 10 needs.

Figure 2:
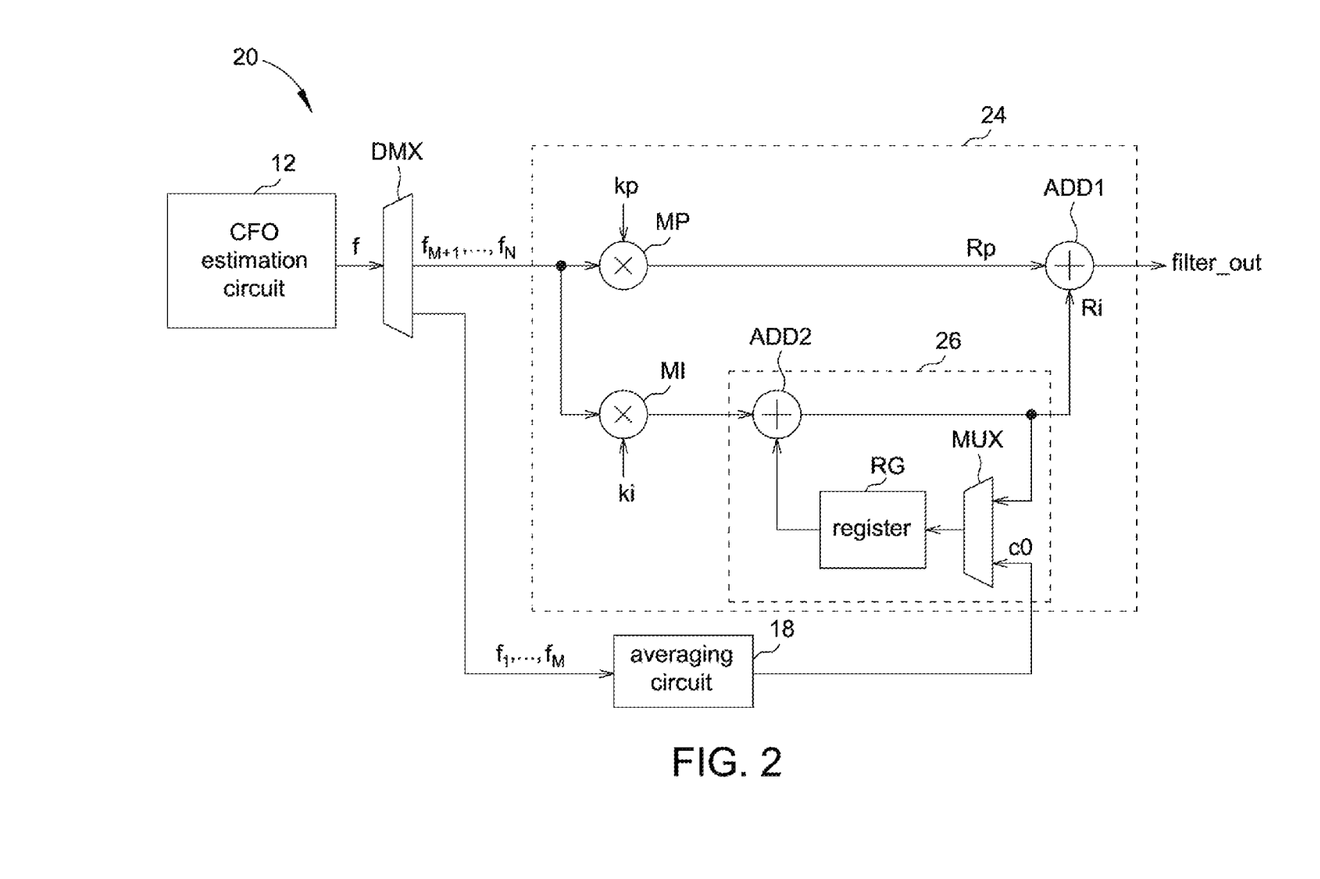
FIG. 2 is a block diagram of a CFO tracking circuit according to an embodiment of the present invention.

Refer to FIG. 2 including a detailed circuit structure of the integration circuit 16. FIG. 2 shows a block diagram of a CFO tracking circuit 20 according to an embodiment of the present invention. The CFO tracking circuit 20 is similar to the CFO tracking circuit 10, and so the same components are represented by the same denotations. Different from the CFO tracking circuit 10, a loop filter 24 in the CFO tracking circuit 20 includes an integration circuit 26, which is a digital integrator for realizing the integration circuit 16. The integration circuit 26 includes an adder ADD2 and a register RG. The adder ADD2, coupled to the multiplier MI, receives a multiplication result of the estimated CFO signal f and the coefficient ki. The register RG, coupled to the adder ADD2, delays the multiplication result of the estimated CFO signal f and the coefficient ki by a period and outputs the delayed multiplication result to the adder ADD2. Thus, the integration circuit 26 achieves an effect of accumulating (i.e., an integration operation) of the estimated CFO signal f and the coefficient ki. In addition, the integration circuit 26 further includes a multiplexer MUX, which outputs the initial value c0 or an output signal of the adder ADD2 to the register RG. For example, in the embodiment in FIG. 2, the output signal of the adder ADD2 is the integration result Ri. In one embodiment, the multiplexer MUX outputs the initial value c0 to the register RG at a time point to at the beginning of the operation of the integration circuit 26, and outputs the output signal of the adder ADD2 to the register RG after the time point $t_0$. Thus, the integration circuit 26 may use the initial value c0 as an initial integration value of the integration operation.

The CFO tracking circuit 20 further includes a demultiplexer DMX, which is coupled between the CFO estimation circuit 12, the loop filter 24 and the averaging circuit 18. The CFO tracking circuit 20 may transmit the estimated CFO values (denoted as estimated CFO values $f_1, \ldots, f_M$) that tracking circuit 10 generates in a first time interval at the beginning of the operation through the demultiplexer DMX. The averaging circuit 18 may calculate the average value corresponding to the estimated CFO values $f_1, \ldots, f_M$ as the initial value c0. In one embodiment, the initial value c0 may be represented as $$c0 = \frac{1}{M} \sum_{m=1}^{M} f_m.$$

Further, after the averaging circuit 18 generates the initial value c0, the CFO tracking circuit 20 may transmit the estimated CFO values (denoted as estimated CFO values $f_{M+1}, \ldots, f_N$) that the CFO tracking circuit 10 generates in a second time interval to the loop filter 24 through the demultiplexer DMX. The loop filter 24 uses the initial value c0 as the initial integration value of the integration operation, and performs a loop filer operation on the estimated CFO values $f_{M+1}, \ldots, f_N$. The second time interval is after the first time interval, and the estimated CFO values $f_1, \ldots, f_M$ and $f_{M+1}, \ldots, f_N$ represent a time series in a temporal order. Thus, the CFO tracking circuit 20 may shorten the tracking time it needs to further enhance the overall performance.

Figure 4:
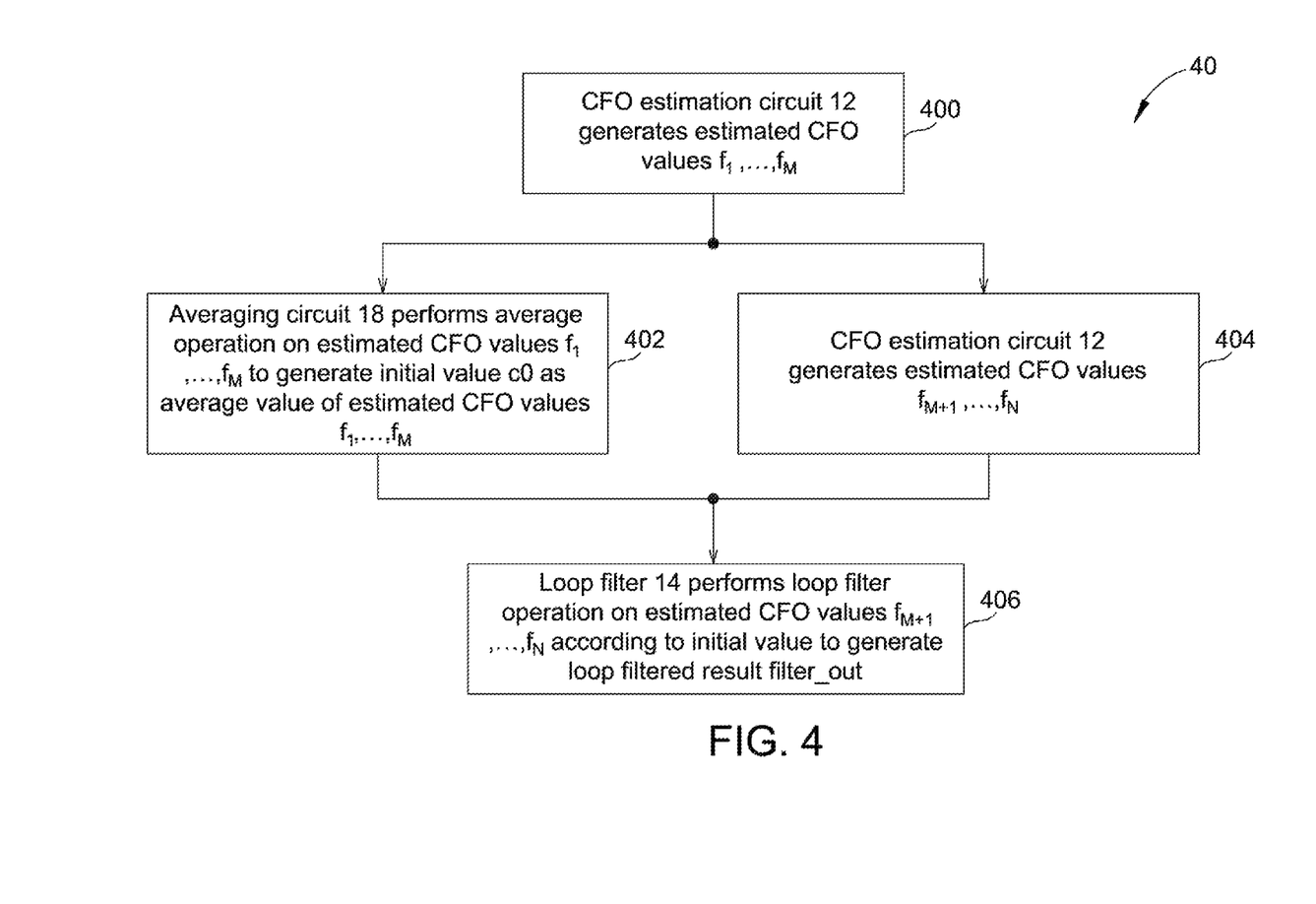
FIG. 4 is a flowchart of a CFO tracking method according to an embodiment of the present invention.

Operations of the CFO tracking circuit 20 may be concluded into a process. FIG. 4 shows a flowchart of a process 40 of a CFO tracking method according to an embodiment of the present invention. The process 40 may be performed by the CFO tracking circuit 20. As shown in FIG. 4, the process 40 includes following steps.

In step 400, the CFO estimation circuit 12 generates the estimated CFO values $f_1, \ldots, f_M$.

In step 402, the averaging circuit 18 performs an average operation on the estimated CFO values $f_1, \ldots, f_M$ to generate the initial value c0 as an average value of the estimated CFO values $f_1, \ldots, f_M$.

In step 404, the CFO estimation circuit 12 generates the estimated CFO values $f_{M+1}, \ldots, f_N$.

In step 406, the loop filter 14 performs a loop filter operation on the estimated CFO values $f_{M+1}, \ldots, f_N$ according to the initial value c0 to generate a loop filtered result filter_out.

Operation details of the process 40 may be referred from the foregoing description, and shall be omitted herein.

It should be noted that, the above embodiments are for explaining the concept of the present invention, and modifications may be made thereto by one person skilled in the art. For example, in the embodiment in FIG. 1, the multiplier MI and the integration circuit 16 in the loop filter 14 may be swapped. That is, the loop filter of the present invention may first perform an integration operation on the estimated CFO signal f, and then multiply the integration result generated from the integration operation performed on the estimated CFO signal f by the coefficient ki to generate the integration result Ri to the adder ADD1. Such modification is also encompassed within the scope of the present invention.

Figure 5:
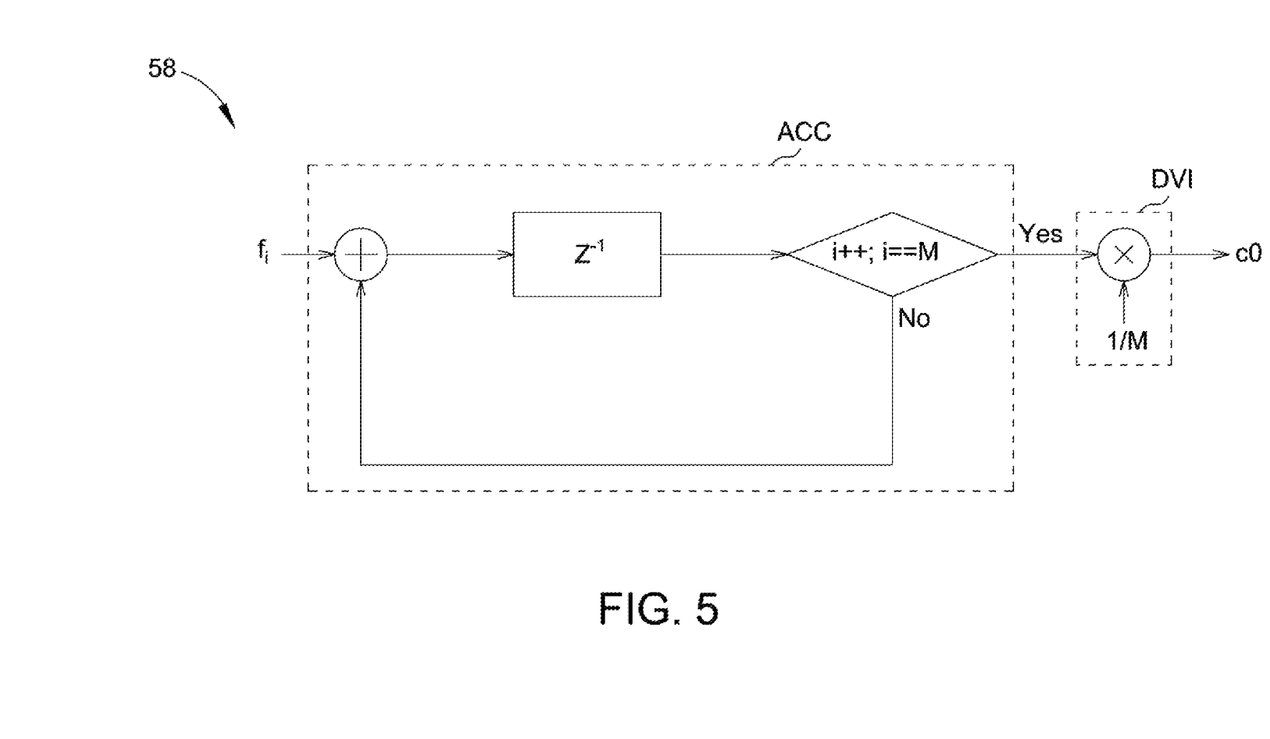
FIG. 5 is a schematic diagram of an averaging circuit according to an embodiment of the present invention.

Further, the averaging circuit 18 is not limited to being implemented by a predetermined circuit structure. For example, referring to FIG. 5 showing a schematic diagram of an averaging circuit 58 according to an embodiment of the present invention, the averaging circuit 58 may be used to realize the averaging circuit 18. The average circuit 58 includes an accumulator ACC and a divider DVI. The accumulator ACC accumulates the $f_1, \ldots, f_M$ to generate an accumulation result. The divider DVI divides the accumulation result by M, i.e., a value among the estimated CFO values $f_1, \ldots, f_M$.

The average operation that the averaging circuit 18 performs on the estimated CFO values $f_1, \ldots, f_M$ is not limited to an equal weighted average operation such as $$c0 = \frac{1}{M}\sum_{m=1}^{M} f_m.$$

Instead, the averaging circuit 18 may perform a non-equal weighted average operation on the estimated CFO values $f_1, \ldots, f_M$. For example, the averaging circuit 18 may calculate the initial value c0 as $$c0 = \sum_{m=1}^{M} \omega_m f_m,$$

where the weight coefficient $\omega_m$ may differ from one another and satisfies a relationship $$\sum_{m=1}^{M} \omega_m = 1.$$

Associated implementation details are generally known to one person skilled in the art, and shall be omitted herein.

Further, one person skilled in the art can understand that the function units/circuits in FIG. 1, FIG. 2 and FIG. 5 may be realized or implemented by application-specific integrated circuits (ASICs), digital circuits (e.g., RTL circuits) or digital signal processors (DSPs), and associated details are omitted herein.

In conclusion, in the present invention, an average value of an estimated CFO signal is used as an initial integration value of an integration operation of a loop filter. Thus, the tracking time needed by the CFO tracking circuit may be shortened to further enhance the overall performance of a receiving apparatus.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A carrier frequency offset (CFO) tracking circuit, comprising:
   a CFO estimation circuit, generating an estimated CFO signal;
   a loop filter, coupled to the CFO estimation circuit, performing a loop filter operation on the estimated CFO signal according to an initial value to generate a loop filtered result; and
   an averaging circuit, coupled to the CFO estimation circuit and the loop filter, performing an average operation on the estimated CFO signal to generate the initial value as an average value of the estimated CFO signal.

2. The CFO tracking circuit according to claim 1, wherein the loop filter comprises:
   a first adder, coupled to the CFO estimation circuit;
   a first multiplier, coupled between the CFO estimation circuit and the first adder;
   a second multiplier, coupled between the CFO estimation circuit and the first adder; and
   an integration circuit, coupled to the averaging circuit and the CFO estimation circuit.

3. The CFO tracking circuit according to claim 2, wherein the first multiplier multiplies the estimated CFO signal by a first coefficient to generate a proportional result, the second multiplier multiplies the estimated CFO signal by a second coefficient, and the integration circuit performs an integration operation on the estimated CFO being multiplied by the second coefficient according to the initial value to generate an integration result, and the first adder adds the proportional result and the integration result to generate the loop filtered result.

4. The CFO tracking circuit according to claim 2, wherein the integration circuit comprises:
   a second adder, coupled to between the CFO estimation circuit and the first adder;
   a register, coupled between the first adder and the second adder; and
   a multiplexer, coupled between the second adder, the averaging circuit and the register.

5. The CFO tracking circuit according to claim 4, wherein the multiplexer outputs the initial value or an output signal of the second adder to the register.

6. The CFO tracking circuit according to claim 1, wherein the averaging circuit comprises:
   an accumulator, accumulating a plurality of first estimated CFO values of the estimated CFO signal to generate an accumulation result.

7. The CFO tracking circuit according to claim 6, wherein the averaging circuit further comprises:
   a divider, dividing the accumulation result by a value among the plurality of first estimated CFO values.

8. The CFO tracking circuit according to claim 1, further comprising:
   a demultiplexer, coupled to the CFO estimation circuit, the loop filter and the averaging circuit;
   wherein, in a first time interval, the demultiplexer transmits a plurality of first estimated CFO values of the estimated CFO signal to the averaging circuit, and the averaging circuit performs the average operation on the plurality of first estimated CFO values; and
   in a second time interval, the demultiplexer transmits a plurality of second estimated CFO values of the estimated CFO signal to the loop filter, and the loop filter performs the loop filter operation on the plurality of second estimated CFO values.

9. A carrier frequency offset (CFO) tracking method, comprising:
   obtaining an estimated CFO signal;
   performing an average operation on the estimated CFO signal to generate an initial value as an average of the estimated CFO signal; and
   performing a loop filter operation on the estimated CFO signal according to the initial value to generate loop filtered result.

10. The CFO tracking method according to claim 9, further comprising:

performing the averaging operation on a plurality of first estimated CFO values of the estimated CFO signal to generate the initial value as the average value of the plurality of first estimated CFO values; and performing the loop filter operation on a plurality of second estimated CFO values of the estimated CFO signal according to the initial value to generate the loop filtered result.

* * * * *